No. 792,332. PATENTED JUNE 13, 1905.
J. L. LEE.
PRINTER'S BLOCK.
APPLICATION FILED JUNE 27, 1901.
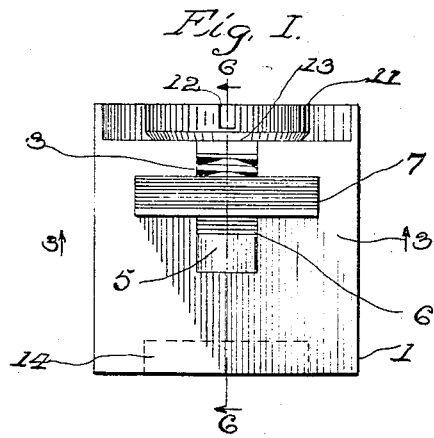
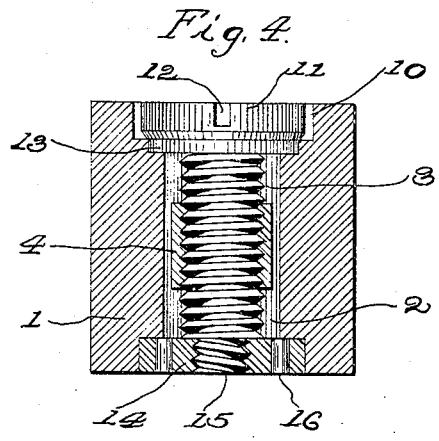
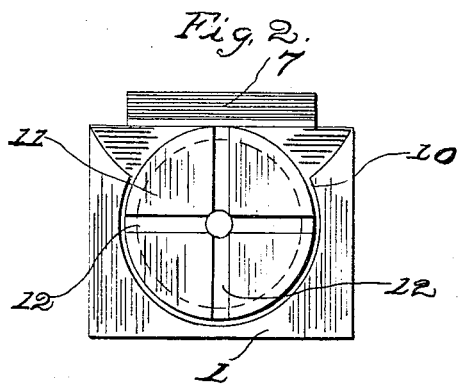
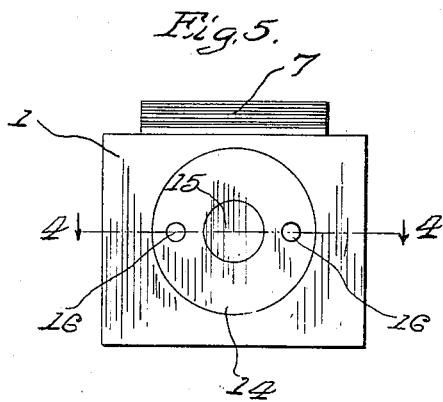
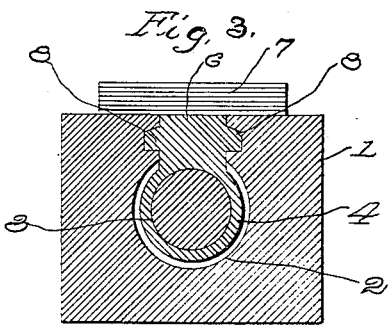
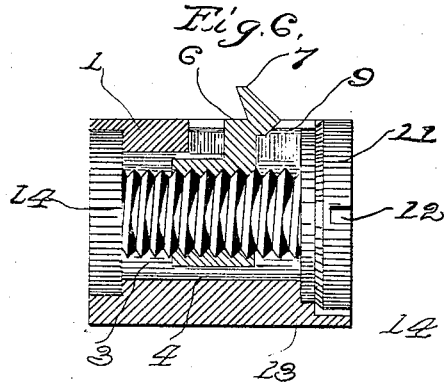
WITNESSES:
INVENTOR
Jas. L. Lee
BY Elliott & Hopkins
ATTORNEYS No. 792,332. Patented June 13, 1905.

UNITED STATES PATENT OFFICE.

JAMES L. LEE, OF CHICAGO, ILLINOIS.

PRINTER'S BLOCK.

SPECIFICATION forming part of Letters Patent No. 792,332, dated June 13, 1905.

Application filed June 27, 1901. Serial No. 66,309.

*To all whom it may concern:*

Be it known that I, JAMES L. LEE, a citizen of the United States, residing at Chicago, in the county of Cook and State of Illinois, have invented certain new and useful Improvements in Printers' Blocks, of which the following is a full, clear, and exact specification.

My invention relates to printers' blocks or hooks for holding stereotype and other printing-plates; and it has for its object to provide an improved construction whereby the screw which moves the hook will have adequate bearing free from an objectionable degree of friction.

A further object of my invention is to minimize the number of parts and simplify the construction.

With these ends in view my invention consists in certain features of novelty in the construction, combination, and arrangement of parts by which the said objects and certain other objects hereinafter appearing are attained, all as fully described with reference to the accompanying drawings, and more particularly pointed out in the claims.

In the said drawings, Figure 1 is a plan view of a printer's block constructed according to my invention. Fig. 2 is an end elevation thereof. Fig. 3 is a cross-section taken on the line 3 3, Fig. 1. Fig. 4 is a plan section taken on the line 4 4, Fig. 5. Fig. 5 is an elevation of the end opposite that presented in Fig. 2; and Fig. 6 is a longitudinal section taken on the line 6 6, Fig. 1.

1 is a block which is preferably solid or formed of a single piece and which is provided with a recess 2, extending longitudinally thereof, for the accommodation of a screw 3 and a slide 4, which runs on said screw in the usual or any suitable manner, but preferably does not touch the bottom of the recess 2. The recess 2 opens upwardly along a portion of its length through the top or upper face of the block 1, as shown at 5, and fitting accurately within this top opening of the recess 2 is a shank 6, which is secured to or formed on the slide 4 and which carries a hook 7 of the usual or any suitable construction, adapted to engage the edge of the plate to be held. If desired, the sides of the shank 6 may also be provided with wings or lateral lugs 8, which engage in corresponding grooves 9 in the sides of the recess in which the shank 6 moves, so as to afford a firm bearing for the shank irrespective of any bearing which may be afforded by the screw 3.

One end of the recess 2 opens out into a larger recess 10, which is formed in the end of the block 1 and which receives a disk 11, formed on or secured to the screw 3 and having radial key-slots 12 formed in its outer face for the reception of a turning-key, whereby the screw may be rotated and the hook 7 accordingly adjusted back and forth for engaging or disengaging the plate. On the inner side or face of the disk 11 is formed a journal 13, which is afforded a bearing directly upon the block 1 by means of a counterbore, being represented by the same line which illustrates the journal 13. By means of this journal 13 it will be seen, therefore, that the screw is afforded adequate bearing at one end directly upon the block and is held against lateral movement and also end movement in one direction. This journal 13 is so formed and proportioned with relation to the hook 7 that as the hook approaches the limit of its outward movement it will lap over the journal 13, thus permitting the engaging face of the hook to come as near as possible to the outer edge of the block 1. The opposite end of the block is formed with a counterbore which communicates with the recess 2 and in which is arranged an enlarged disk 14, constituting a journal in which a reduced end 15 of the screw 3 is threaded, the threads of the end 15 being preferably of opposite turn to those of the main part of the screw. The disk 14 may be provided with sockets 16 for the application of a turning-wrench, whereby the disk may be firmly secured on the end of the screw, and thereby caused to turn with the latter and constitute a firm and easy-running support therefor, while at the same time holding the screw from being pulled out endwise.

Having thus described my invention, what I claim as new therein, and desire to secure by Letters Patent, is—

1. In a printer's block the combination of a block proper having a longitudinal recess provided with an enlarged journal-bearing formed in one end of said block and an enlarged recess formed in the other end of said block and having a counterbore of smaller diameter than said latter recess constituting a second journal-bearing, a screw located in said recess, a hook operatively connected with said screw, an enlarged disk secured to one end of said screw and fitting said first journal-bearing, a disk secured to the other end of said screw and having key-slots in one face and a reduced journal on its other face fitting said second journal-bearing, substantially as set forth.

2. In a printer's block the combination of a block proper, a screw recessed in said block proper, means at one end of said screw for holding it against end thrust in one direction, a member countersunk in the block and threaded on the opposite end of said screw for holding the latter against end thrust in the opposite direction, the said latter threads being of opposite turn to those of the main part of the screw and a slide having a hook, arranged in operative relation to said screw, substantially as set forth.

3. In a printer's block the combination of a block proper, a screw recessed in said block, a turning disk or device secured to one end of said screw and having bearing against one end of said block for holding the screw against end thrust in one direction, a circular member countersunk in the opposite end of the block and threaded on the screw at the latter end for holding the screw against end thrust in the opposite direction, the said latter threads being of opposite turn to those of the main part of the screw, and a slide having a hook, arranged in operative relation to said screw, substantially as set forth.

JAMES L. LEE.

Witnesses:
  F. A. HOPKINS,
  D. C. GURNEE.